US012576823B2

(12) United States Patent
Georgin et al.

(10) Patent No.: US 12,576,823 B2
(45) Date of Patent: Mar. 17, 2026

(54) BRAKE COEFFICIENT OF FRICTION (μ) ESTIMATION FOR PROGNOSTICS AND HEALTH MANAGEMENT (PHM) AND IMPROVED LOAD BALANCE (LB)

(71) Applicant: GOODRICH CORPORATION, Charlotte, NC (US)

(72) Inventors: Marc J Georgin, Oakwood, OH (US); Matthew Ryan O'Neil, Tipp City, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 162 days.

(21) Appl. No.: 18/544,839

(22) Filed: Dec. 19, 2023

(65) Prior Publication Data

US 2025/0196828 A1    Jun. 19, 2025

(51) Int. Cl.
*B60T 8/74* (2006.01)
*B60T 8/17* (2006.01)
*B60T 8/171* (2006.01)
*B60T 8/172* (2006.01)
*B60T 8/58* (2006.01)
*B60T 13/66* (2006.01)
*B60T 17/22* (2006.01)
(Continued)

(52) U.S. Cl.
CPC .............. *B60T 8/74* (2013.01); *B60T 8/1703* (2013.01); *B60T 8/171* (2013.01); *B60T 8/172* (2013.01); *B60T 8/58* (2013.01); *B60T 13/662* (2013.01); *B60T 17/22* (2013.01); *B64C 25/42* (2013.01); *B64F 5/60* (2017.01); *B60T 2240/00* (2013.01)

(58) Field of Classification Search
None
See application file for complete search history.

(56) References Cited

U.S. PATENT DOCUMENTS 3,847,445 A * 11/1974 Bissell .................. B64C 25/426
                                                              303/135
3,917,356 A * 11/1975 DeVlieg ............... B60T 8/1703
                                                              244/111
(Continued)

FOREIGN PATENT DOCUMENTS

AU        2001278582 A1 * 5/2002
CN          118220478 A * 6/2024 .............. B60T 8/325
(Continued)

OTHER PUBLICATIONS

European Patent Office, European Search Report dated May 6, 2025 in Application No. 24216295.6.

*Primary Examiner* — Kevin R Steckbauer
(74) *Attorney, Agent, or Firm* — SNELL & WILMER L.L.P.

(57) ABSTRACT

A method for controlling brake assemblies of a vehicle is provided. Receiving a deceleration of each wheel assembly of a plurality of wheel assemblies of the vehicle. Comparing the deceleration of each wheel assembly to an average deceleration of the plurality of wheel assemblies. Responsive to one or more of the deceleration of each wheel assembly of one or more wheel assemblies being outside a predetermined range of the average deceleration of the plurality of wheel assemblies, reporting a warning message to a maintenance crew to inspect one or more brake assemblies associated with the one or more wheel assemblies.

17 Claims, 7 Drawing Sheets

(51) Int. Cl.
　B64C 25/42 　　(2006.01)
　B64F 5/60 　　(2017.01)

(56) 　　　References Cited

U.S. PATENT DOCUMENTS

| | | | | | |
|---|---|---|---|---|---|
| 3,920,204 | A | | 11/1975 | Bissel et al. | |
| 3,920,282 | A | * | 11/1975 | DeVlieg | B64C 25/426 |
| | | | | | 303/113.5 |
| 4,061,403 | A | | 12/1977 | Peterson et al. | |
| 4,076,331 | A | * | 2/1978 | DeVlieg | B60T 13/12 |
| | | | | | 244/111 |
| 4,078,845 | A | | 3/1978 | Amberg et al. | |
| 5,390,990 | A | * | 2/1995 | Cook | B60T 8/885 |
| | | | | | 303/7 |
| 5,507,568 | A | * | 4/1996 | Cook | B60T 8/00 |
| | | | | | 303/7 |
| 5,605,387 | A | * | 2/1997 | Cook | B60T 17/221 |
| | | | | | 303/135 |
| 5,700,072 | A | * | 12/1997 | Cook | B60T 17/221 |
| | | | | | 303/7 |
| 8,102,280 | B2 | * | 1/2012 | Cahill | B60T 17/22 |
| | | | | | 340/960 |
| 8,180,548 | B2 | | 5/2012 | Cahill | |
| 8,229,641 | B2 | | 7/2012 | Clothier | |
| 8,843,254 | B2 | * | 9/2014 | Cahill | B60T 8/1703 |
| | | | | | 701/14 |
| 9,296,488 | B2 | | 3/2016 | McKeown et al. | |
| 9,981,754 | B2 | * | 5/2018 | Georgin | G08G 5/74 |
| 10,005,566 | B2 | * | 6/2018 | Cahill | B64D 45/00 |
| 10,800,392 | B2 | * | 10/2020 | Alam | B60T 17/221 |
| 10,882,500 | B2 | * | 1/2021 | Burte | B64D 45/00 |
| 10,899,325 | B2 | | 1/2021 | Georgin et al. | |
| 11,505,173 | B2 | * | 11/2022 | Georgin | B60T 8/1703 |
| 2007/0175713 | A1 | * | 8/2007 | DeVlieg | B60T 8/1703 |
| | | | | | 188/158 |
| 2009/0001806 | A1 | * | 1/2009 | DeVlieg | B60T 8/00 |
| | | | | | 303/20 |

| | | | | | |
|---|---|---|---|---|---|
| 2010/0225503 | A1 | * | 9/2010 | Cahill | B60T 17/22 |
| | | | | | 340/960 |
| 2010/0268404 | A1 | * | 10/2010 | Devlieg | B60T 8/1703 |
| | | | | | 701/3 |
| 2010/0286881 | A1 | * | 11/2010 | Cahill | F16D 66/026 |
| | | | | | 701/70 |
| 2011/0106389 | A1 | * | 5/2011 | Devlieg | B60T 8/00 |
| | | | | | 701/70 |
| 2014/0018978 | A1 | * | 1/2014 | Cahill | B60T 8/1703 |
| | | | | | 701/3 |
| 2015/0012201 | A1 | * | 1/2015 | Metzger | B64C 25/426 |
| | | | | | 701/82 |
| 2017/0355473 | A1 | * | 12/2017 | Cahill | B64C 25/34 |
| 2018/0297573 | A1 | * | 10/2018 | Alam | B60T 17/221 |
| 2020/0172066 | A1 | * | 6/2020 | Burte | B60T 8/1703 |
| 2020/0180781 | A1 | * | 6/2020 | Mckeown | G08G 5/54 |
| 2021/0284120 | A1 | * | 9/2021 | Georgin | B60T 8/1703 |
| 2021/0347350 | A1 | * | 11/2021 | Bains | B64C 25/44 |
| 2025/0196828 | A1 | * | 6/2025 | Georgin | B60T 8/172 |

FOREIGN PATENT DOCUMENTS

| | | | | | | |
|---|---|---|---|---|---|---|
| DE | 102014119329 | A1 | * | 11/2015 | ............... | B60T 8/88 |
| DE | 102014225448 | A1 | * | 6/2016 | ............. | B60T 8/171 |
| DE | 102014119329 | B4 | * | 2/2021 | ............. | B60T 8/885 |
| EP | 0567862 | A1 | * | 11/1993 | ............. | B60T 8/88 |
| EP | 0664249 | A2 | * | 7/1995 | ............. | B60T 8/52 |
| EP | 0567862 | B1 | * | 9/1995 | ............. | B60T 8/88 |
| EP | 0601365 | | | 1/1998 | | |
| EP | 2684752 | A1 | * | 1/2014 | ............. | B60T 8/1703 |
| EP | 3659877 | A1 | * | 6/2020 | ........... | B60T 17/221 |
| EP | 2684752 | B1 | * | 1/2022 | ........... | B60T 8/1703 |
| EP | 3659877 | B1 | * | 8/2023 | ........... | B60T 8/1703 |
| EP | 4574595 | A1 | * | 6/2025 | ........... | B60T 13/662 |
| FR | 2942758 | A1 | * | 9/2010 | ............ | B60T 17/22 |
| FR | 2945265 | A1 | * | 11/2010 | ............ | B64C 25/426 |
| JP | H07186919 | A | * | 7/1995 | ............. | B60T 8/52 |
| RU | 2284274 | C2 | * | 9/2006 | | |

* cited by examiner

FRONT OF PLANE

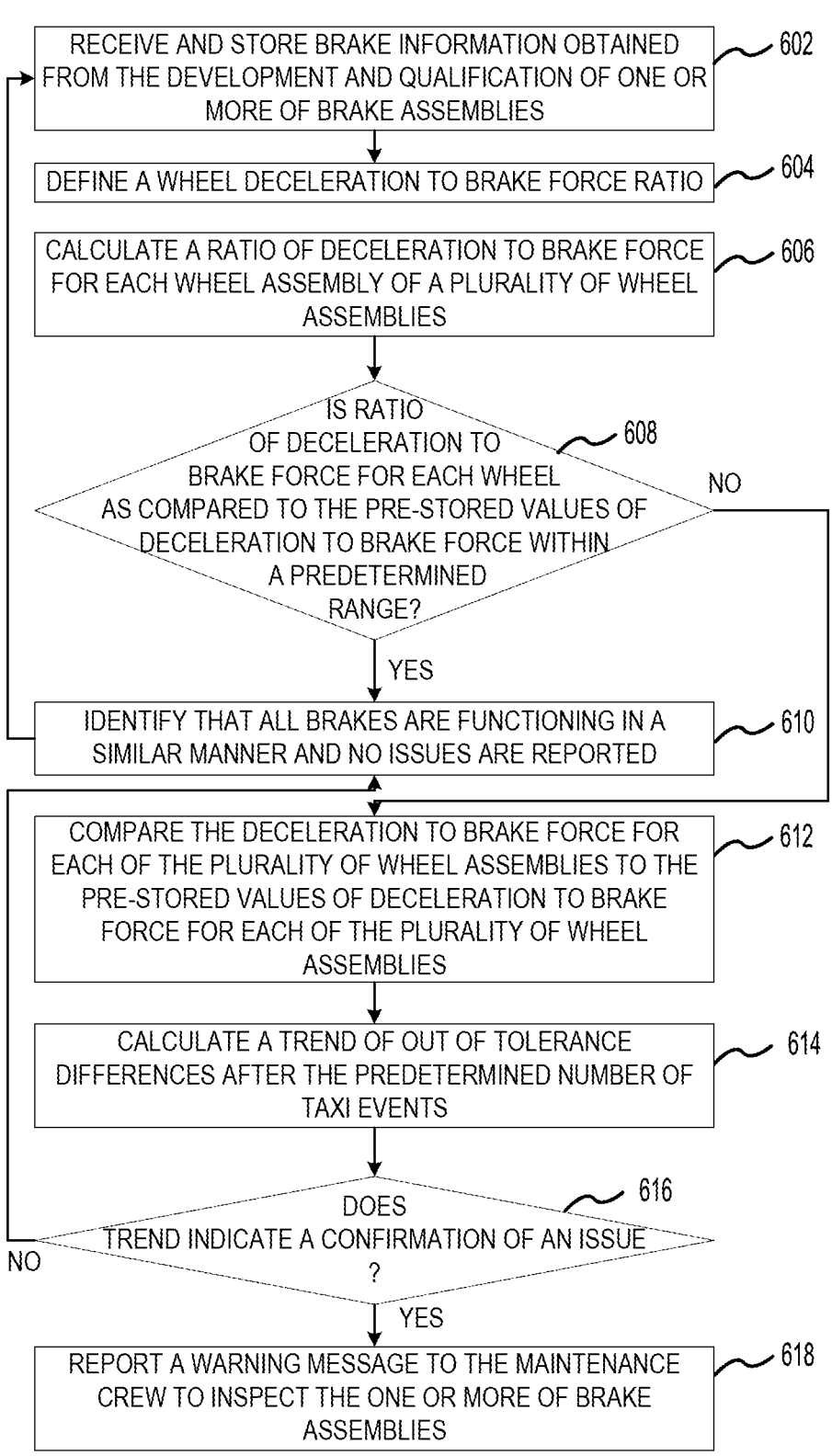

602 — RECEIVE AND STORE BRAKE INFORMATION OBTAINED FROM THE DEVELOPMENT AND QUALIFICATION OF ONE OR MORE OF BRAKE ASSEMBLIES

604 — DEFINE A WHEEL DECELERATION TO BRAKE FORCE RATIO

606 — CALCULATE A RATIO OF DECELERATION TO BRAKE FORCE FOR EACH WHEEL ASSEMBLY OF A PLURALITY OF WHEEL ASSEMBLIES

608 — IS RATIO OF DECELERATION TO BRAKE FORCE FOR EACH WHEEL AS COMPARED TO THE PRE-STORED VALUES OF DECELERATION TO BRAKE FORCE WITHIN A PREDETERMINED RANGE?

NO

YES

610 — IDENTIFY THAT ALL BRAKES ARE FUNCTIONING IN A SIMILAR MANNER AND NO ISSUES ARE REPORTED

612 — COMPARE THE DECELERATION TO BRAKE FORCE FOR EACH OF THE PLURALITY OF WHEEL ASSEMBLIES TO THE PRE-STORED VALUES OF DECELERATION TO BRAKE FORCE FOR EACH OF THE PLURALITY OF WHEEL ASSEMBLIES

614 — CALCULATE A TREND OF OUT OF TOLERANCE DIFFERENCES AFTER THE PREDETERMINED NUMBER OF TAXI EVENTS

616 — DOES TREND INDICATE A CONFIRMATION OF AN ISSUE?

NO

YES

618 — REPORT A WARNING MESSAGE TO THE MAINTENANCE CREW TO INSPECT THE ONE OR MORE OF BRAKE ASSEMBLIES

FIG.6

BRAKE COEFFICIENT OF FRICTION (μ) ESTIMATION FOR PROGNOSTICS AND HEALTH MANAGEMENT (PHM) AND IMPROVED LOAD BALANCE (LB)

FIELD

The present disclosure generally relates to the field of aircraft and, more particularly, to control of aircraft braking systems using an estimated coefficient of friction (μ) for prognostics and health management (PHM) and improved load balance (LB).

BACKGROUND

Aircraft typically include a braking system operatively coupled to the wheels of the aircraft and configured to slow the wheels, and the aircraft, during, for example, landing or a rejected takeoff. Aircraft braking systems tend to utilize aircraft brake controllers, i.e. a brake control unit (BCU), to control various aspects of the braking system. In this regard, as a pilot applies force to the brake pedals, the BCU detects the force applied by the pilot and produces a braking command to control the amount of braking at each wheel, i.e. a pressure or force applied at the brake that is increased to decelerate the wheel and aircraft.

SUMMARY

According to various embodiments of the present disclosure, a method for controlling brake assemblies of a vehicle is provided. The method includes receiving a deceleration of each wheel assembly of a plurality of wheel assemblies of the vehicle, comparing the deceleration of each wheel assembly to an average deceleration of the plurality of wheel assemblies, and, responsive to one or more of the deceleration of each wheel assembly of one or more wheel assemblies being outside a predetermined range of the average deceleration of the plurality of wheel assemblies, reporting a warning message to a maintenance crew to inspect one or more brake assemblies associated with the one or more wheel assemblies.

In various embodiments, the deceleration of each wheel assembly of the plurality of wheel assemblies is determined by an associated wheel speed transducer as brakes are being applied to the respective wheel assembly.

In various embodiments, responsive to one or more of the deceleration of each wheel assembly of one or more wheel assemblies being outside the predetermined range of the average deceleration of the plurality of wheel assemblies, the method includes comparing the deceleration of the one or more wheel assemblies with respect to the average deceleration of the plurality of wheel assemblies over a predetermined number of taxi events, calculating a trend of out of tolerance differences after the predetermined number of taxi events, and, responsive to the trend being confirmed after the predetermined number of taxi events, reporting the warning message to the maintenance crew to inspect the one or more brake assemblies associated with the one or more wheel assemblies.

In various embodiments, the predetermined range is ±20% of the average deceleration of the plurality of wheel assemblies.

In various embodiments, responsive to one or more of the deceleration of each wheel assembly of one or more wheel assemblies being within the predetermined range of the average deceleration of the plurality of wheel assemblies, the method includes identifying that all brakes are functioning in a similar manner and reporting no issues.

In various embodiments, the method includes defining a wheel deceleration to brake force ratio based on brake information obtained from development and qualification of a plurality of brake assemblies of the plurality of wheel assemblies of the vehicle, during taxi when a force is applied to brake pedals, calculating a ratio of deceleration to brake force for each wheel assembly of the plurality of wheel assemblies, determining whether the ratio of deceleration to brake force for each wheel assembly of the plurality of wheel assemblies as compared to the defined wheel deceleration to brake force ratio within a predetermined range, and, responsive to one or more ratios of deceleration to brake force for one or more wheel assembly of the plurality of wheel assemblies as compared to the defined wheel deceleration to brake force ratio being outside the predetermined range, reporting the warning message to the maintenance crew to inspect the one or more brake assemblies associated with the one or more wheel assemblies.

In various embodiments, wherein the predetermined range is ±25%.

In various embodiments, the method includes comparing the deceleration to brake force for each of the plurality of wheel assemblies to pre-stored values of deceleration to brake force for each of the plurality of wheel assemblies over a predetermined number of taxi events, calculating a trend of out of tolerance differences after the predetermined number of taxi events, and, responsive to the trend being confirmed after the predetermined number of taxi events, reporting the warning message to the maintenance crew to inspect the one or more brake assemblies associated with the one or more wheel assemblies.

Also disclosed herein is a braking system for controlling brake assemblies of a vehicle. The braking system includes a brake control unit. The brake control unit is configured to receive a deceleration of each wheel assembly of a plurality of wheel assemblies of the vehicle, compare the deceleration of each wheel assembly to an average deceleration of the plurality of wheel assemblies, and, responsive to one or more of the deceleration of each wheel assembly of one or more wheel assemblies being outside a predetermined range of the average deceleration of the plurality of wheel assemblies, report a warning message to a maintenance crew to inspect one or more brake assemblies associated with the one or more wheel assemblies.

In various embodiments, the deceleration of each wheel assembly of the plurality of wheel assemblies is determined by an associated wheel speed transducer as brakes are being applied to the respective wheel assembly.

In various embodiments, the brake control unit is further configured to, responsive to one or more of the deceleration of each wheel assembly of one or more wheel assemblies being outside the predetermined range of the average deceleration of the plurality of wheel assemblies, compare the deceleration of each wheel assembly of the one or more wheel assemblies with respect to the average deceleration of the plurality of wheel assemblies over a predetermined number of taxi events, calculate a trend of out of tolerance differences after the predetermined number of taxi events, and, responsive to the trend being confirmed after the predetermined number of taxi events, report the warning message to the maintenance crew to inspect the one or more brake assemblies associated with the one or more wheel assemblies.

In various embodiments, the predetermined range is ±20% of the average deceleration of the plurality of wheel assemblies.

In various embodiments, the brake control unit is further configured to, responsive to one or more of the deceleration of each wheel assembly of one or more wheel assemblies being within the predetermined range of the average deceleration of the plurality of wheel assemblies, identify that all brakes are functioning in a similar manner and reporting no issues.

In various embodiments, the brake control unit is further configured to define a wheel deceleration to brake force ratio based on brake information obtained from development and qualification of a plurality of brake assemblies of the plurality of wheel assemblies of the vehicle, during taxi when a force is applied to brake pedals, calculate a ratio of deceleration to brake force for each wheel assembly of the plurality of wheel assemblies, determine whether the ratio of deceleration to brake force for each wheel assembly of the plurality of wheel assemblies as compared to the defined wheel deceleration to brake force ratio within a predetermined range, and, responsive to one or more ratios of deceleration to brake force for one or more wheel assembly of the plurality of wheel assemblies as compared to the defined wheel deceleration to brake force ratio being outside the predetermined range, report the warning message to the maintenance crew to inspect the one or more brake assemblies associated with the one or more wheel assemblies.

In various embodiments, the predetermined range is ±25%.

In various embodiments, the brake control unit is further configured to compare the deceleration to brake force for each of the plurality of wheel assemblies to pre-stored values of deceleration to brake force for each of the plurality of wheel assemblies over a predetermined number of taxi events, calculate a trend of out of tolerance differences after the predetermined number of taxi events, and, responsive to the trend being confirmed after the predetermined number of taxi events, report the warning message to the maintenance crew to inspect the one or more brake assemblies associated with the one or more wheel assemblies.

Also disclosed herein is a method for controlling brake assemblies of a vehicle. The method includes calculating an average wheel deceleration for a plurality of wheel assemblies, determining a deceleration of each wheel with respect to an average deceleration, and, responsive to receiving a commanded brake wheel force, utilizing the deceleration of each wheel with respect to the average deceleration and the commanded brake wheel force to calculate at least one of an increase, a decrease, or a no change with respect to an amount of force to apply to a respective brake assembly associated with a respective wheel assembly of the plurality of wheel assemblies.

In various embodiments, responsive to calculating the increase in the amount of force to apply to the respective brake assembly, the method includes applying the commanded brake wheel force increased by the amount of force to the respective brake assembly.

In various embodiments, responsive to calculating the decrease in the amount of force to apply to the respective brake assembly, the method includes applying the commanded brake wheel force decreased by the amount of force to the respective brake assembly.

In various embodiments, responsive to calculating no change in the amount of force to apply to the respective brake assembly, the method includes applying the commanded brake wheel force to the respective brake assembly.

The present disclosure may include any one or more of the individual features disclosed above and/or below alone or in any combination thereof. The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

FIG. 6 illustrates a second method for aircraft brake control, in accordance with various embodiments.

DETAILED DESCRIPTION

Figure 1:
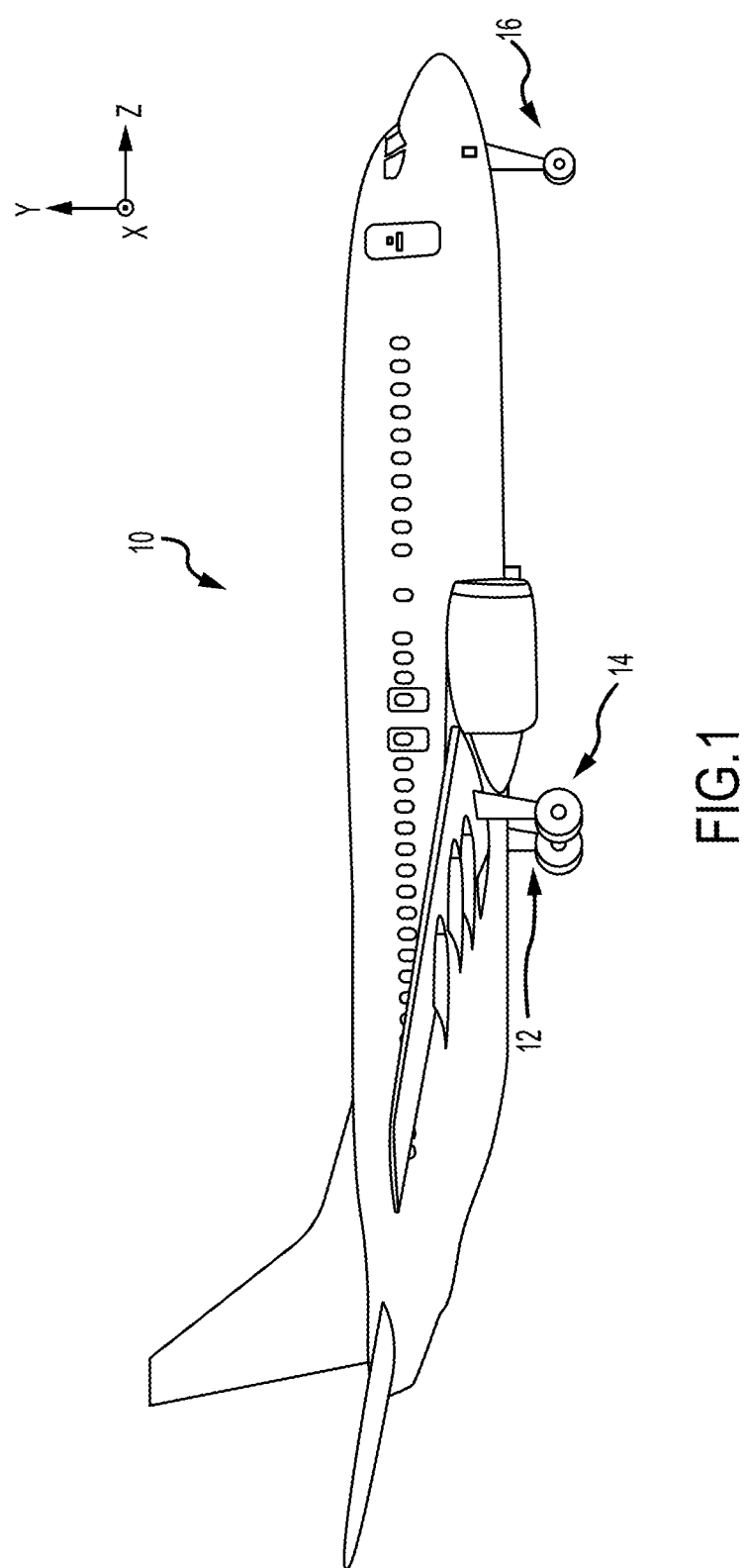
FIG. 1 illustrates an aircraft, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an," or "the" may include one or more than one and that reference to an item in the singular may also include the item in the plural. Further, all ranges may include upper and lower values and all ranges and ratio limits disclosed herein may be combined.

As stated previously, aircraft typically include a braking system operatively coupled to the wheels of the aircraft and configured to slow the wheels, and the aircraft, during, for example, landing or a rejected takeoff. Aircraft braking systems tend to utilize aircraft brake system controllers, i.e. a brake control unit (BCU), to control various aspects of the aircraft braking system. In this regard, as a pilot applies force to the brake pedals, the BCU detects the pedal deflection applied by the pilot and produces a braking command to control the amount of braking at each wheel, i.e. a pressure or force applied at the brake of each wheel that is increased to decelerate the wheel and aircraft. However, a brake's coefficient of friction (µ) may change significantly from brake to brake, for example, on the order of 5% to 20%. On a four-brake aircraft, if a brake's µ changes as compared to the other three brakes, an unexpected yaw may be experienced on the aircraft in response to the pilot applying force to the brake pedals. For example, if a brake' µ is increased by 50% on a left outer brake (LOB), then when the pilot depresses the left and right pedals equally, the aircraft will veer unexpectedly to the left while the pilot's intent is to slow down the aircraft in a straight line. Similarly, during autobrake, where the BCU tries to maintain equal pressure in a hydraulic system and equal force in an electric brake system to all brakes, the same yaw effect would occur.

Therefore, disclosed herein are methods and systems for aircraft braking systems control using an estimated coefficient of friction (µ) for prognostics and health management (PHM) and improved load balance (LB). In various embodiments, in order to improve the PHM, after disengaging the parking brake and during braking applications at taxi speeds without antiskid and above 10 kts, in a four-wheel aircraft, i.e. four wheels per landing gear "truck", the BCU measures the deceleration of each wheel. Responsive to the aircraft traveling in a substantially straight line and receiving a braking command, meaning the left and right pedal commands are similar, in various embodiments, the BCU compares each deceleration of each of the four wheels to an average deceleration of the four wheels. In various embodiments, responsive to the BCU determining that the comparisons are all within a predetermined range of the average deceleration of the four wheels, the BCU identifies that all brakes are functioning in a similar manner and no issues are reported. In various embodiments, responsive to the BCU determining that one or more of the decelerations of the four wheels is outside the predetermined range of the average deceleration of the four wheels, indicating that a brake may be operating erroneously with respect to the brake's coefficient of friction (µ), the BCU may compare the deceleration of the one or more four wheels with respect to the average deceleration of the four wheels over a predetermined number of taxi events in order to calculate the trend of out of tolerance differences. In various embodiments, responsive to a trend being unconfirmed after the predetermined number of taxi events, then the BCU identified no issues. However, in various embodiments, responsive to a trend being confirmed after the predetermined number of taxi events, then the BCU reports a warning message to the maintenance crew to inspect the associated brake.

In various embodiments, in order to improve the PHM, the BCU may utilize information obtained from the development and qualification of the brake. In that regard, in various embodiments, brake information may be obtained during development, i.e. wheel deceleration or brake force (or pressure) applied for various wheel speeds, among others. In various embodiments, a wheel deceleration to brake force ratio may be defined at various wheel speeds, which the BCU stores in a memory. Accordingly, in various embodiments, during taxi when the pilot applies a force to the brake pedals regardless of whether the aircraft is going in a straight line or not, the BCU calculates a ratio of deceleration to brake force for each wheel and compares to the pre-stored values of deceleration to brake force in memory. In various embodiments, responsive to the BCU determining that the ratio of deceleration to brake force for each wheel and to the pre-stored values of deceleration to brake force in memory is within a predetermined range, the BCU identifies that all brakes are functioning in a similar manner and no issues are reported. In various embodiments, responsive to the BCU determining that the ratio of deceleration to brake force for each wheel and to the pre-stored values of deceleration to brake force in memory is outside the predetermined range, indicating that a brake may be operating erroneously with respect to the brake's coefficient of friction (µ), the BCU may monitor the out of tolerance information over a predetermined number of taxi events and store the data in a memory to calculate the trend of the out of tolerance differences. In various embodiments, responsive to a trend being unconfirmed after the predetermined number of taxi events, then the BCU identified no issues. However, in various embodiments, responsive to a trend being confirmed after the predetermined number of taxi events, then the BCU reports a warning message to the maintenance crew to inspect the associated brake.

In various embodiments, in order to improve the PHM as well as load balance, either during auto braking or during manual braking responsive to the left and right pedal commands being similar, the BCU commands control of the deceleration of the aircraft's center of gravity by applying a common force to all brakes. Because various brakes have higher coefficient of friction (µ) and other brakes have a lower coefficient of friction (µ), in various embodiments, responsive to the BCU commanding a common force to all brakes, various ones of the brakes may work more while various ones of the brakes may work less. "Work" as described herein is a contribution to the overall deceleration of the aircraft. In various embodiments, the BCU commanding a common force to all brakes may cause controllability issues during braking and various brakes may absorb more energy and other brakes may absorb less energy at the end of a landing resulting with the colder brakes potentially wearing out faster and causing premature oxidation issues on the hotter brakes.

In order to address this issue, in various embodiments, during landing and taxi braking, the BCU calculates the average wheel deceleration of all four wheels. In various embodiments, the BCU compares the specific deceleration of each wheel to the average. In various embodiments, the BCU may estimate the "work," as described above, of a wheel by computing a slip of the wheel. However, one difficulty with estimating accurately the slip of a wheel is knowing the rolling radius of each wheel. Accordingly, in various embodiments, the BCU utilizes a wheel's angular deceleration, which is accurately measured by the wheel speed sensor and, therefore, does not require the wheel's rolling radius. In that regard, in various embodiments, the BCU determines the deceleration of each wheel with respect to the average deceleration using the following equation:

$$N(\text{wheel\_k}) = \frac{\text{deceleration(wheel\_k)}}{0.25 * \sum_{i=1}^{i=4} \text{deceleration}(i)}$$

where k varies from 1 to 4 in a 4-wheel aircraft. As an example, the following deceleration of each wheel with respect to the average deceleration may result in:

| Brake | LOB | LIB | RIB | ROB |
|---|---|---|---|---|
| Deceleration of each wheel with respect to the average | 1.05 | .96 | 1 | 1.01 | where LOB is the left outer wheel, LIB is the left inner wheel, RIB is the right inner wheel, and ROB is the right outer wheel. With reference to the table, the wheel associated with the left outer brake (LOB) and the wheel associated with the right outer brake (ROB) are decelerating more than the average, i.e. 5% more and 1% more, respectively, for the same force application and therefore have brake coefficient of friction ($\mu$) that are lower than the average. In that regard, as an example, assuming that the autobrake wheel force commanded is 20,000 lbf (88964.432 N) the BCU sends a force command to the LOB scaled by 1.05 to decrease the wheel deceleration and bring the LOB brake force command in line with the average, i.e. the BCU commands the LOB wheel brake with (20,000*1.05)=21,000 lbf (93412.65 N). Similarly, the BCU sends a force command to the ROB scaled by 1.01 to decrease the wheel deceleration and bring the ROB brake force command in line with the average, i.e. the BCU commands the ROB wheel brake with (20,000*1.01)=20,200 lbf (89854.08 N). Further, the BCU sends a force command to the LIB scaled by 0.96 to increase the wheel deceleration and bring the LIB brake force command in line with the average, i.e. the BCU commands the LIB wheel brake with (20,000*0.96)=19,200 lbf (85405.86N). Since the RIB does not need correction, the BCU commands the RIB wheel brake with 20,000 lbf (88964.432 N). In various embodiments, the BCU may be limited in scaling up to 10% to avoid disrupting the braking function.

Referring now to FIG. 1, in accordance with various embodiments, an aircraft 10 is illustrated. The aircraft 10 includes landing gear, which may include a left main landing gear 12, a right main landing gear 14 and a nose landing gear 16. The landing gear support the aircraft 10 when it is not flying, allowing the aircraft 10 to taxi, take off and land without damage. While the disclosure refers to the three landing gear configurations just referred, the disclosure nevertheless contemplates any number of landing gear configurations.

Figure 2:
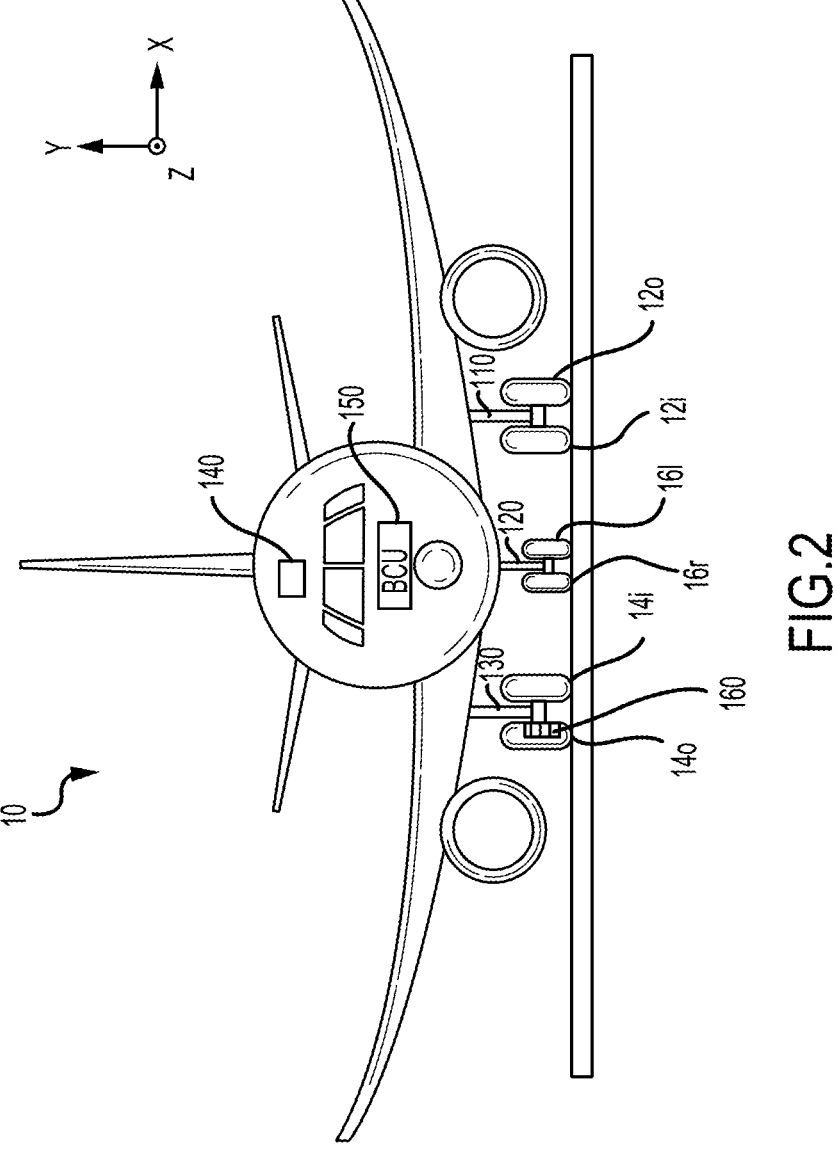
FIG. 2 illustrates an aircraft including multiple landing gear systems, in accordance with various embodiments.

Turning now to FIG. 2, in accordance with various embodiments, an aircraft 100 includes multiple landing gear systems, including a first landing gear 110, second landing gear 120, and third landing gear 130 is illustrated. The first landing gear 110, second landing gear 120, and third landing gear 130 each include one or more wheel assemblies. In various embodiments, the second landing gear 120, which is also a nose landing gear for the aircraft 100, includes a left wheel assembly 161 and a right wheel assembly 16r. In various embodiments, the first landing gear 110 includes an inboard wheel assembly 12i and an outer wheel assembly 120, and the third landing gear 130 includes an inner wheel assembly 14i and an outer wheel assembly 140. The first landing gear 110, second landing gear 120, and third landing gear 130 support the aircraft 100 when the aircraft 100 is not flying, thereby allowing the aircraft 100 to take off, land, and taxi without damaging the aircraft 100. In various embodiments, the second landing gear 120 is also a nose landing gear for the aircraft 100, and often times, one or more of the first landing gear 110, second landing gear 120, and third landing gear 130 are operationally retractable into the aircraft 100 when the aircraft 100 is in flight and/or airborne.

In various embodiments, the aircraft 100 further includes an avionics unit 140, which includes one or more controllers (e.g., processors) and one or more tangible, non-transitory memories capable of implementing digital or programmatic logic. In various embodiments, for example, the one or more controllers are one or more of a general-purpose processor, digital signal processor (DSP), application specific integrated circuit (ASIC), field programmable gate array (FPGA), or other programmable logic device, discrete gate, transistor logic, or discrete hardware components, or any various combinations thereof or the like. In various embodiments, the avionics unit 140 controls, at least various parts of, the flight of, and operation of various components of, the aircraft 100. For example, the avionics unit 140 controls various parameters of flight, such as an air traffic management systems, auto-pilot systems, auto-thrust systems, crew alerting systems, electrical systems, electronic checklist systems, electronic flight bag systems, engine systems flight control systems, environmental systems, hydraulics systems, lighting systems, pneumatics systems, traffic avoidance systems, trim systems, and the like.

In various embodiments, the aircraft 100 further includes a brake control unit (BCU) 150. The BCU 150 includes one or more controllers (e.g., processors) and one or more tangible, non-transitory memories capable of implementing digital or programmatic logic. In various embodiments, for example, the one or more controllers are one or more of a general purpose processor, DSP, ASIC, FPGA, or other programmable logic device, discrete gate, transistor logic, or discrete hardware components, or any various combinations thereof or the like, and the one or more memories store instructions that are implemented by the one or more controllers for performing various functions, such as monitoring a health status of a servo valve, as will be discussed herein. In various embodiments, the BCU 150 controls, at least various parts of, the braking of the aircraft 100. For example, the BCU 150 controls various parameters of braking, such as manual brake control, automatic brake control, antiskid braking, locked wheel protection, touchdown protection, park capability, gear retraction braking, and the like.

In various embodiments, the aircraft 100 further includes one or more brakes coupled to each wheel assembly. For example, a brake 160 is coupled to the outer wheel assembly 140 of the third landing gear 130 of the aircraft 100. In operation, the brake 160 applies a braking force to the outer wheel assembly 140 upon receiving a brake command, such as from the BCU 150. In various embodiments, the outer wheel assembly 140 of the third landing gear 130 of the aircraft 100 includes any number of wheels.

Figure 3:
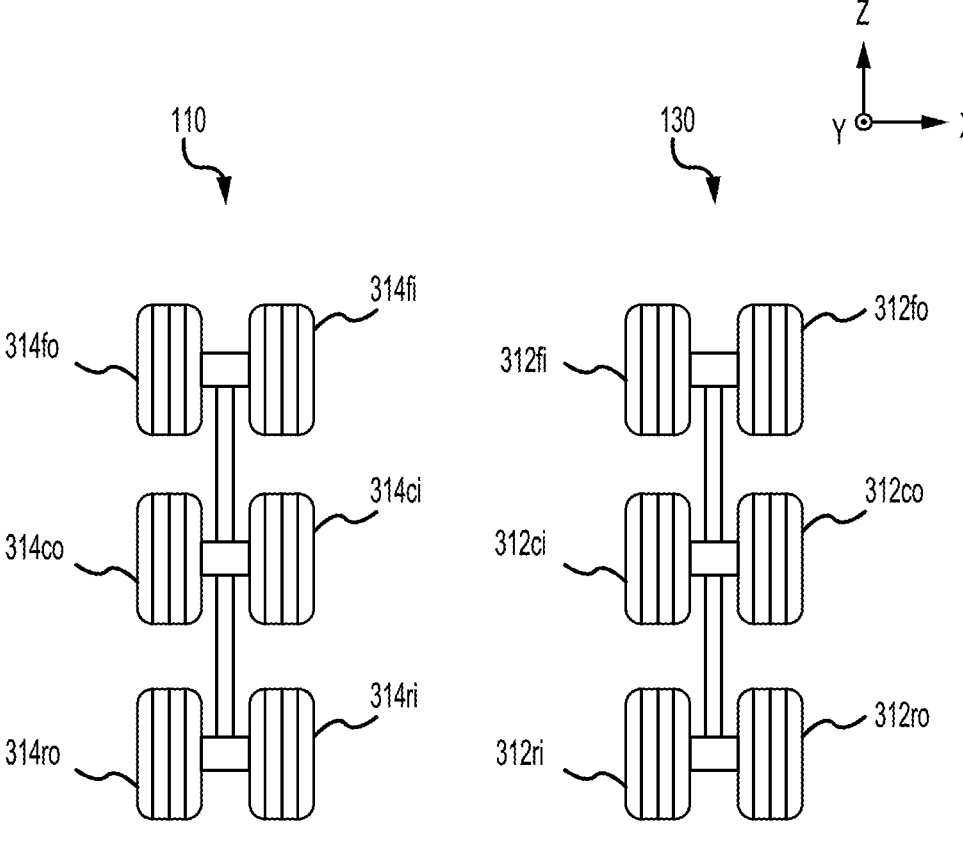
FIG. 3 illustrates a top view of landing gears with a plurality of a wheel sets, in accordance with various embodiments.

Turning now to FIG. 3, in accordance with various embodiments, a top view of landing gears with a plurality of a wheel sets is illustrated. That is, in various embodiments, landing gears, such as first landing gear 110 and third landing gear 130, may having multiple sets of wheels, referred to as a truck or a bogie. For example, there may be two sets of wheels, i.e., four wheels on the first landing gear 110 and four wheels on the third landing gear 130, or, as illustrated, three sets of wheels, i.e., six wheels on the first landing gear 110 and six wheels on the third landing gear 130. In various embodiments, the wheels are symmetrically controlled based on the wheel's position, i.e., which row (in a z-direction) and whether the wheel is inboard or outboard. Therefore, in FIG. 3, front wheel assembly 312fi is symmetric with front wheel assembly 314fi, front wheel assembly 312fo is symmetric with front wheel assembly 314fo, center wheel assembly 312ci is symmetric with center wheel assembly 314ci, center wheel assembly 312co is symmetric with center wheel assembly 314_co_, rear wheel assembly 312_ri_ is symmetric with rear wheel assembly 314_ri_, and rear wheel assembly 312_ro_ is symmetric with rear wheel assembly 314_ro_.

Figure 4:
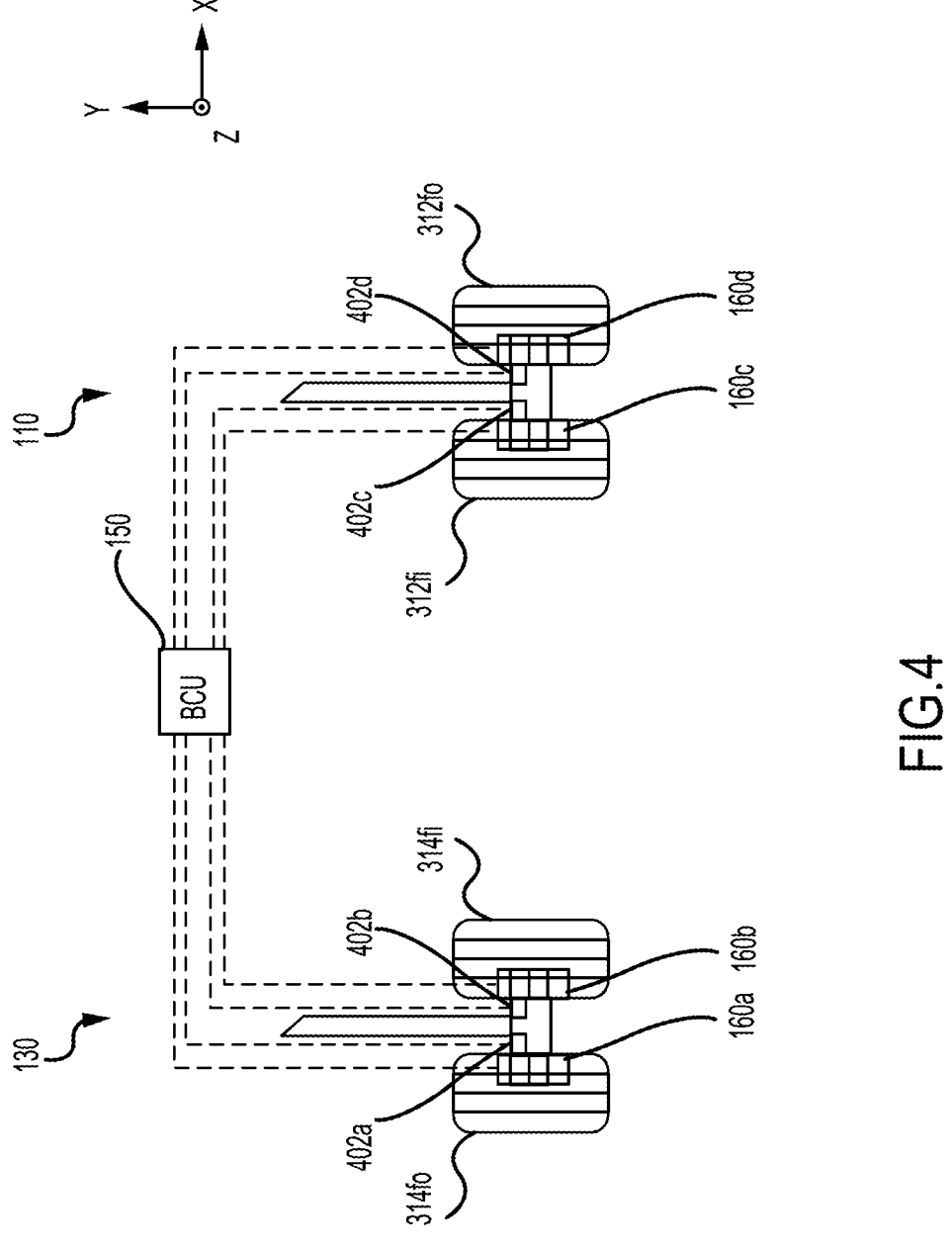
FIG. 4 illustrates a front view of landing gears with a plurality of a wheel sets, in accordance with various embodiments.

Turning now to FIG. 4, in accordance with various embodiments, a front view of landing gears with a plurality of a wheel sets is illustrated. In this illustration, only the front wheel assemblies 312_fo_, 312_fi_, 314_fi_, and 314_fo_ are depicted. However, the operations described hereafter with regard to the front wheel assemblies 312_fo_, 312_fi_, 314_fi_, and 314_fo_ operates similarly with regard to the center wheel assemblies 312_co_, 312_ci_, 314_ci_, and 314_co_ and the rear wheel assemblies 312_ro_, 312_ri_, 314_ri_, and 314_ro_.

The rotational dynamics of each of the front wheel assemblies 312_fo_, 312_fi_, 314_fi_, and 314_fo_ may be expressed as:

$$I_w \dot{\Omega} = T_{fr} - T_{brake} \tag{1}$$

where $I_w$ is the inertia, i.e. the moment of inertia of the wheel, brake and tire, $\dot{\Omega}$ is the angular acceleration of the wheel, $T_{fr}$ is the torque exerted on a wheel due to frictional drag of the runway and the brake torque $T_{brake}$ is obtained as:

$$T_{brake} = K_{brake} F_{brake} \tag{2}$$

where $K_{brake}$ is a constant multiplier that converts the actuator force to torque. This constant depends on the brake friction coefficients ($\mu_{brake}$) and number of brake friction surfaces. In various embodiments, equations 1 and 2 illustrate that the wheel deceleration and the corresponding brake force are closely related to the brake's coefficient of friction ($\mu$) value. That is, in various embodiments, the higher the brake torque, the lower the wheel angular deceleration. In various embodiments, the BCU 150 determines wheel angular deceleration for each of the front wheel assemblies 312_fo_, 312_fi_, 314_fi_, and 314_fo_ through the differentiation of an angular wheel speed transducer signal and applied brake force.

In that regard, in various embodiments, each of front wheel assemblies 312_fo_, 312_fi_, 314_fi_, and 314_fo_ comprises a brake assemblies 160_a_, 160_b_, 160_c_, or 160_d_, respectively, and a wheel speed transducer 402_a_, 402_b_, 402_c_, or 402_d_, respectively. In various embodiments, each of the wheel speed transducers 402_a_, 402_b_, 402_c_, and 402_d_, which may also be referred to as a wheel speed sensor, measures a rotation of its associated wheel. In various embodiments, responsive to the aircraft being in motion, the brake control unit (BCU) 150 receives an indication of wheel speed from each of the wheel speed transducers 402_a_, 402_b_, 402_c_, and 402_d_. In various embodiments, in order to improve the prognostics and health management (PHM), after disengaging the parking brake and during braking applications at taxi speeds without antiskid and above 10 kts, the BCU 150 may receive a deceleration of each of front wheel assemblies 312_fo_, 312_fi_, 314_fi_, and 314_fo_ from each of the wheel speed transducers 402_a_, 402_b_, 402_c_, and 402_d_ as the brakes are being applied to the wheel. Responsive to the aircraft 100 traveling in a substantially straight line and receiving a braking command, meaning the left and right pedal commands are similar, in various embodiments, the BCU 150 compares each deceleration of each of the four front wheel assemblies 312_fo_, 312_fi_, 314_fi_, and 314_fo_ to an average deceleration of the four front wheel assemblies 312_fo_, 312_fi_, 314_fi_, and 314_fo_.

In various embodiments, responsive to the BCU 150 determining that the comparisons are all within a predetermined range of the average deceleration of the four front wheel assemblies 312_fo_, 312_fi_, 314_fi_, and 314_fo_, the BCU 150 identifies that all brakes are functioning in a similar manner and no issues are reported. In various embodiments, the predetermined range may be ±20%. In various embodiments, the predetermined range may be ±15%. In various embodiments, the predetermined range may be ±10%. In various embodiments, responsive to the BCU 150 determining that one or more of the decelerations of the four front wheel assemblies 312_fo_, 312_fi_, 314_fi_, and 314_fo_ is outside the predetermined range of the average deceleration of the four front wheel assemblies 312_fo_, 312_fi_, 314_fi_, and 314_fo_, indicating that one or more of brake assemblies 160_a_, 160_b_, 160_c_, or 160_d_ may have an issue with respect to the brake's coefficient of friction ($\mu$), the BCU 150 may compare the deceleration of the one or more four front wheel assemblies 312_fo_, 312_fi_, 314_fi_, and 314_fo_ with respect to the average deceleration of the four front wheel assemblies 312_fo_, 312_fi_, 314_fi_, and 314_fo_ over a predetermined number of taxi events and store the data in a memory to calculate the trend of out of tolerance differences. In various embodiments, responsive to a trend being unconfirmed after the predetermined number of taxi events, i.e. the BCU 150 determines that a deceleration of one or more of the four front wheel assemblies 312_fo_, 312_fi_, 314_fi_, and 314_fo_ was outside the predetermined range of the average deceleration of the four front wheel assemblies 312_fo_, 312_fi_, 314_fi_, and 314_fo_ but has returned to within the predetermined range of the average deceleration of the four front wheel assemblies 312_fo_, 312_fi_, 314_fi_, and 314_fo_, then the BCU 150 identified no issues. However, in various embodiments, responsive to a trend being confirmed associated with one or more of brake assemblies 160_a_, 160_b_, 160_c_, or 160_d_ after the predetermined number of taxi events, then the BCU 150 reports a warning message to the maintenance crew to inspect the one or more of brake assemblies 160_a_, 160_b_, 160_c_, or 160_d_.

In various embodiments, in order to improve the PHM, the BCU 150 may also utilize information obtained from the development and qualification of the one or more of brake assemblies 160_a_, 160_b_, 160_c_, or 160_d_. In that regard, in various embodiments, brake information may be obtained during development, i.e. wheel deceleration or brake force (or pressure) applied for various wheel speeds, among others, of the four front wheel assemblies 312_fo_, 312_fi_, 314_fi_, and 314_fo_. In various embodiments, a wheel deceleration to brake force ratio may be defined at various wheel speeds, which the BCU 150 stores in a memory. Accordingly, in various embodiments, during taxi when the pilot applies a force to the brake pedals regardless of whether the aircraft 100 going in a straight line or not, the BCU 150 calculates a ratio of deceleration to brake force for each of the four front wheel assemblies 312_fo_, 312_fi_, 314_fi_, and 314_fo_ and compares to the pre-stored values of deceleration to brake force in memory. In various embodiments, responsive to the BCU 150 determining that the ratio of deceleration to brake force for each wheel and to the pre-stored values of deceleration to brake force in memory is within a predetermined range, the BCU 150 identifies that all brakes are functioning in a similar manner and no issues are reported. In various embodiments, the predetermined range may be ±25%. In various embodiments, the predetermined range may be ±22%. In various embodiments, the predetermined range may be ±20%.

In various embodiments, responsive to the BCU 150 determining that the ratio of deceleration to brake force for each of the four front wheel assemblies 312*fo*, 312*fi*, 314*fi*, and 314*fo* to the pre-stored values of deceleration to brake force in memory is outside the predetermined range indicating that one or more of brake assemblies 160*a*, 160*b*, 160*c*, or 160*d* may have an issue with respect to the brake's coefficient of friction (μ), the BCU 150 may compare the deceleration to brake force for each of the four front wheel assemblies 312*fo*, 312*fi*, 314*fi*, and 314*fo* to the pre-stored values of deceleration to brake force for each of the four front wheel assemblies 312*fo*, 312*fi*, 314*fi*, and 314*fo* stored in a memory to calculate the trend of out of tolerance differences. In various embodiments, responsive to a trend being unconfirmed after the predetermined number of taxi events, i.e. the BCU 150 determines that the ratio of deceleration to brake force for each of the four front wheel assemblies 312*fo*, 312*fi*, 314*fi*, and 314*fo* to the pre-stored values of deceleration to brake force in memory was outside the predetermined range but has returned to within the predetermined range, then the BCU 150 identified no issues. However, in various embodiments, responsive to a trend being confirmed after the predetermined number of taxi events, then the BCU 150 reports a warning message to the maintenance crew to inspect the one or more of brake assemblies 160*a*, 160*b*, 160*c*, or 160*d*.

In various embodiments, in order to improve the PHM as well as load balance, either during auto braking or during manual braking responsive to the left and right pedal commands being similar, the BCU 150 commands control of the deceleration of the aircraft's center of gravity by applying a common force to all brakes. Because various brakes have higher coefficient of friction (μ) and other brakes have a lower coefficient of friction (μ), in various embodiments, responsive to the BCU 150 commanding a common force to all brakes, various ones of the brakes may, in aggregate, do more work, which may be defined as energy dissipated in the brake in Joules (J), while various other ones of the brakes may, in aggregate, do less work. As stated previously, "work" as described herein is a contribution to the overall deceleration of the aircraft. In various embodiments, the BCU 150 commanding a common force to each of the one or more of brake assemblies 160*a*, 160*b*, 160*c*, or 160*d* may cause controllability issues during braking and various brakes may absorb more energy and other brakes may absorb less energy at the end of a landing resulting with the colder brakes potentially wearing out faster than brakes having a same coefficient of friction (μ) and causing premature oxidation issues on the hotter brakes.

In order to address this issue, in various embodiments, during landing and taxi braking, the BCU 150 calculates the average wheel deceleration of all of the four front wheel assemblies 312*fo*, 312*fi*, 314*fi*, and 314*fo*. In various embodiments, the BCU 150 compares the specific deceleration of each of the four front wheel assemblies 312*fo*, 312*fi*, 314*fi*, and 314*fo* to the average wheel deceleration of all of the four front wheel assemblies 312*fo*, 312*fi*, 314*fi*, and 314*fo*. In various embodiments, the BCU 150 may estimate the "work," as described above, of a wheel by computing a slip associated with each of the four front wheel assemblies 312*fo*, 312*fi*, 314*fi*, and 314*fo*. However, one difficulty with estimating accurately the slip of a wheel is knowing the rolling radius of each of the four front wheel assemblies 312*fo*, 312*fi*, 314*fi*, and 314*fo*. Accordingly, in various embodiments, the BCU 150 utilizes an angular deceleration for each of the four front wheel assemblies 312*fo*, 312*fi*, 314*fi*, and 314*fo*, which is accurately measured by each of the wheel speed transducers 402*a*, 402*b*, 402*c*, and 402*d* and, therefore, does not require the wheel's rolling radius. In that regard, in various embodiments, the BCU 150 determines the deceleration of each wheel with respect to the average deceleration using the following equation:

$$N(\text{wheel\_k}) = \frac{\text{deceleration(wheel\_k)}}{0.25 * \sum_{i=1}^{i=4} \text{deceleration}(i)}$$

where k varies from 1 to 4 in a 4-wheel aircraft. As an example, the following deceleration of each wheel with respect to the average deceleration may result in:

| Brake | LOB | LIB | RIB | ROB |
|---|---|---|---|---|
| Deceleration of each wheel with respect to the average | 1.05 | .96 | 1 | 1.01 | where LOB is the left outer wheel assembly 160*d*, LIB is the left inner wheel assembly 160*c*, RIB is the right inner wheel assembly 160*b*, and ROB is the right outer wheel assembly 160*a*. With reference to the table, the front wheel assembly 312*fo* associated with the left outer brake (LOB) assembly 160*d* and front wheel assembly 314*fo* associated with the right outer brake (ROB) assembly 160*a* are decelerating more than the average, i.e. 5% more and 1% more, respectively, for the same force application and therefore have brake coefficient of friction (μ) that are lower than the average. In that regard, as an example, assuming that the autobrake wheel force commanded is 20,000 lbf, (88964.432 N) the BCU 150 sends a force command to the left outer brake (LOB) assembly 160*d* scaled by 1.05 to decrease the deceleration of the front wheel assembly 312*fo* and bring the left outer brake (LOB) assembly 160*d* force command in line with the average, i.e. the BCU 150 commands the left outer brake (LOB) assembly 160*d* with (20,000*1.05)=21,000 lbf (93412.65 N). Similarly, the BCU 150 sends a force command to the right outer brake (ROB) assembly 160*a* scaled by 1.01 to decrease the deceleration of the front wheel assembly 314*fo* and bring the right outer brake (ROB) assembly 160*a* force command in line with the average, i.e. the BCU 150 commands the right outer brake (ROB) assembly 160*a* with (20,000*1.01)=20,200 lbf (89854.08N). Further, the BCU 150 sends a force command to the left inner brake (LIB) assembly 160*c* scaled by 0.96 to increase the deceleration of the front wheel assembly 312*fi* and bring the left inner brake (LIB) assembly 160*c* force command in line with the average, i.e. the BCU 150 commands the left inner brake (LIB) assembly 160*c* with (20,000*0.96)=19,200 lbf (85405.86N). Since the right inner brake (RIB) assembly 160*b* does not need correction, the BCU 150 commands the right inner brake (RIB) assembly 160*b* with 20,000 lbf (88964.432 N). In various embodiments, the BCU 150 may be limited in scaling up to 10% to avoid disrupting the braking function.

Figure 5:
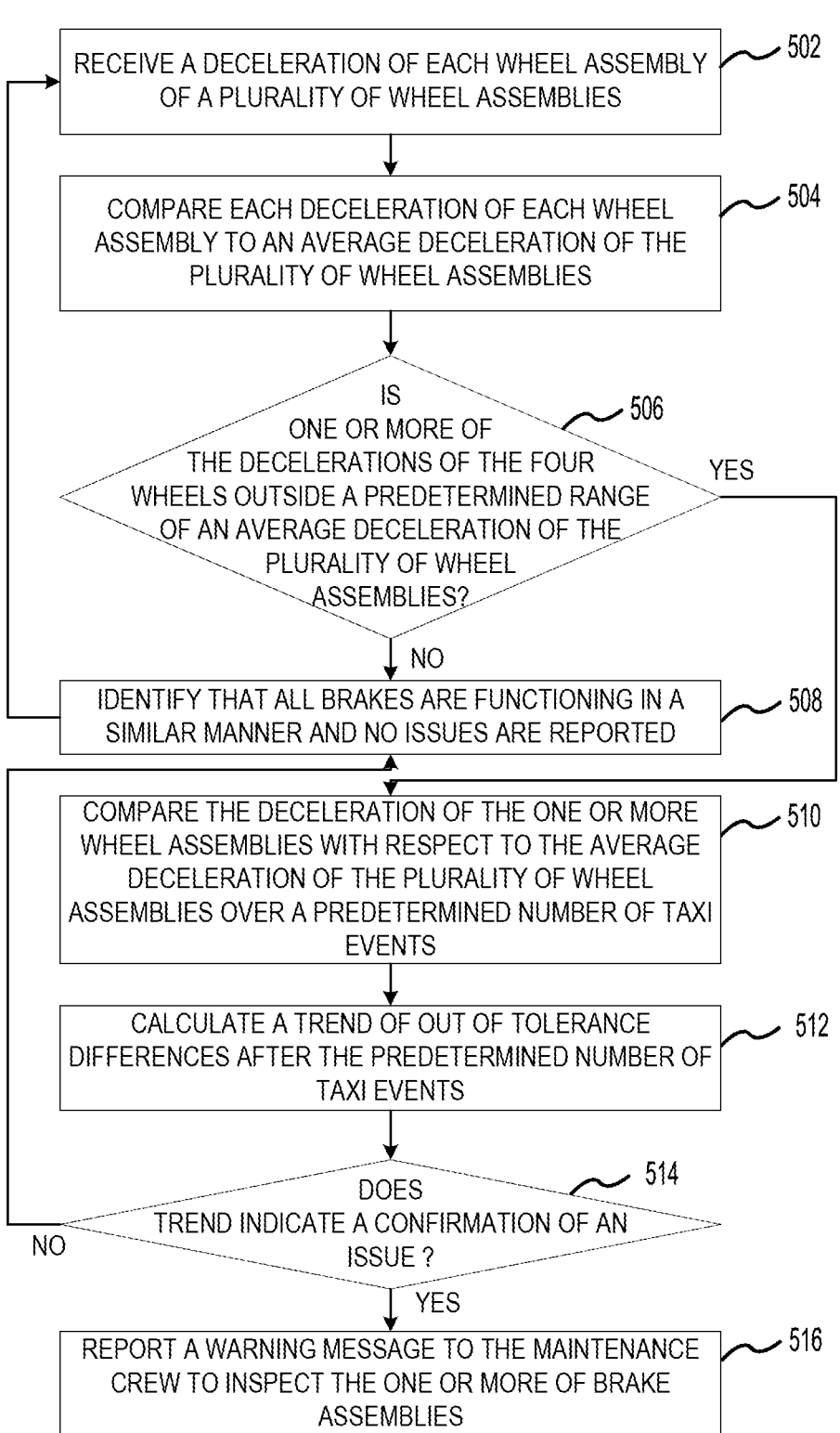
FIG. 5 illustrates a first method for aircraft brake control, in accordance with various embodiments.

Referring now to FIG. 5, in accordance with various embodiments, a method 500 for aircraft brake control is illustrated. Method 500 may be performed by processor within a brake control unit (BCU), such as BCU 150 of FIG. 2. At block 502, the BCU receives a deceleration of each wheel assembly of a plurality of wheel assemblies from an associated wheel speed transducer as the brakes are being applied to the respective wheel assembly. Responsive to the aircraft traveling in a substantially straight line and receiving a braking command, meaning the left and right pedal commands are similar, at block 504, the BCU compares each deceleration of each wheel assembly to an average deceleration of the plurality of wheel assemblies. At block 506, the BCU determines whether one or more of the decelerations of the four wheels is outside the predetermined range of the average deceleration of the plurality of wheel assemblies. If at block 506 the BCU identifies that the decelerations of the four wheels are within predetermined range of the average deceleration of the plurality of wheel assemblies, at block 508, the BCU identifies that all brakes are functioning in a similar manner and no issues are reported, with the operation returning to block 502 thereafter.

If at block 506 the BCU identifies that one or more of the decelerations of the wheel assemblies is outside the predetermined range of the average deceleration of the plurality of wheel assemblies, at block 510 the BCU compares the deceleration of the one or more wheel assemblies with respect to the average deceleration of the plurality of wheel assemblies over a predetermined number of taxi events. At block 512, the BCU calculates the trend of out of tolerance differences after the predetermined number of taxi events. At block 514, the BCU determines whether the trend indicates a confirmation of an issue with one or more brake assemblies associated with the one or more wheel assemblies. If at block 514 the BCU identifies that the trend is unconfirmed after the predetermined number of taxi events, the operation proceeds to block 508. If at block 514 the BCU identifies that the trend is confirmed after the predetermined number of taxi events, at block 516, the BCU reports a warning message to the maintenance crew to inspect the one or more of brake assemblies.

Referring now to FIG. 6, in accordance with various embodiments, a method 600 for aircraft brake control is illustrated. Method 600 may be performed by processor within a brake control unit (BCU), such as BCU 150 of FIG. 2. At block 602, the BCU receives and stores brake information obtained from the development and qualification of one or more of brake assemblies. In that regard, the brake information may include wheel deceleration or brake force (or pressure) applied for various wheel speeds, among others. At block 604 the BCU defines a wheel deceleration to brake force ratio. At block 606, during taxi when the pilot applies a force to the brake pedals regardless of whether the aircraft going in a straight line or not, the BCU calculates a ratio of deceleration to brake force for each wheel assembly of a plurality of wheel assemblies and, at block 608, the BCU determines whether the ratio of deceleration to brake force for each wheel and to the pre-stored values of deceleration to brake force in memory is within a predetermined range. If at block 608 the BCU determines that the ratio of deceleration to brake force for each wheel as compared to the defined values of deceleration to brake force in memory is within a predetermined range, at block 610, the BCU identifies that all brakes are functioning in a similar manner and no issues are reported, with the operation returning to block 602 thereafter.

If at block 608 the BCU determines that the ratio of deceleration to brake force for each wheel and to the pre-stored values of deceleration to brake force in memory is outside the predetermined range, at block 612, the BCU compares the deceleration to brake force for each of the plurality of wheel assemblies to the pre-stored values of deceleration to brake force for each of the plurality of wheel assemblies. At block 614, the BCU calculates a trend of out of tolerance differences after the predetermined number of taxi events. At block 616, the BCU determines whether the trend indicates a confirmation of an issue with one or more brake assemblies associated with the one or more wheel assemblies. If at block 616 the BCU identifies that the trend is unconfirmed after the predetermined number of taxi events, the operation proceeds to block 610. If at block 616 the BCU identifies that the trend is confirmed after the predetermined number of taxi events, at block 618, the BCU reports a warning message to the maintenance crew to inspect the one or more of brake assemblies.

Figure 7:
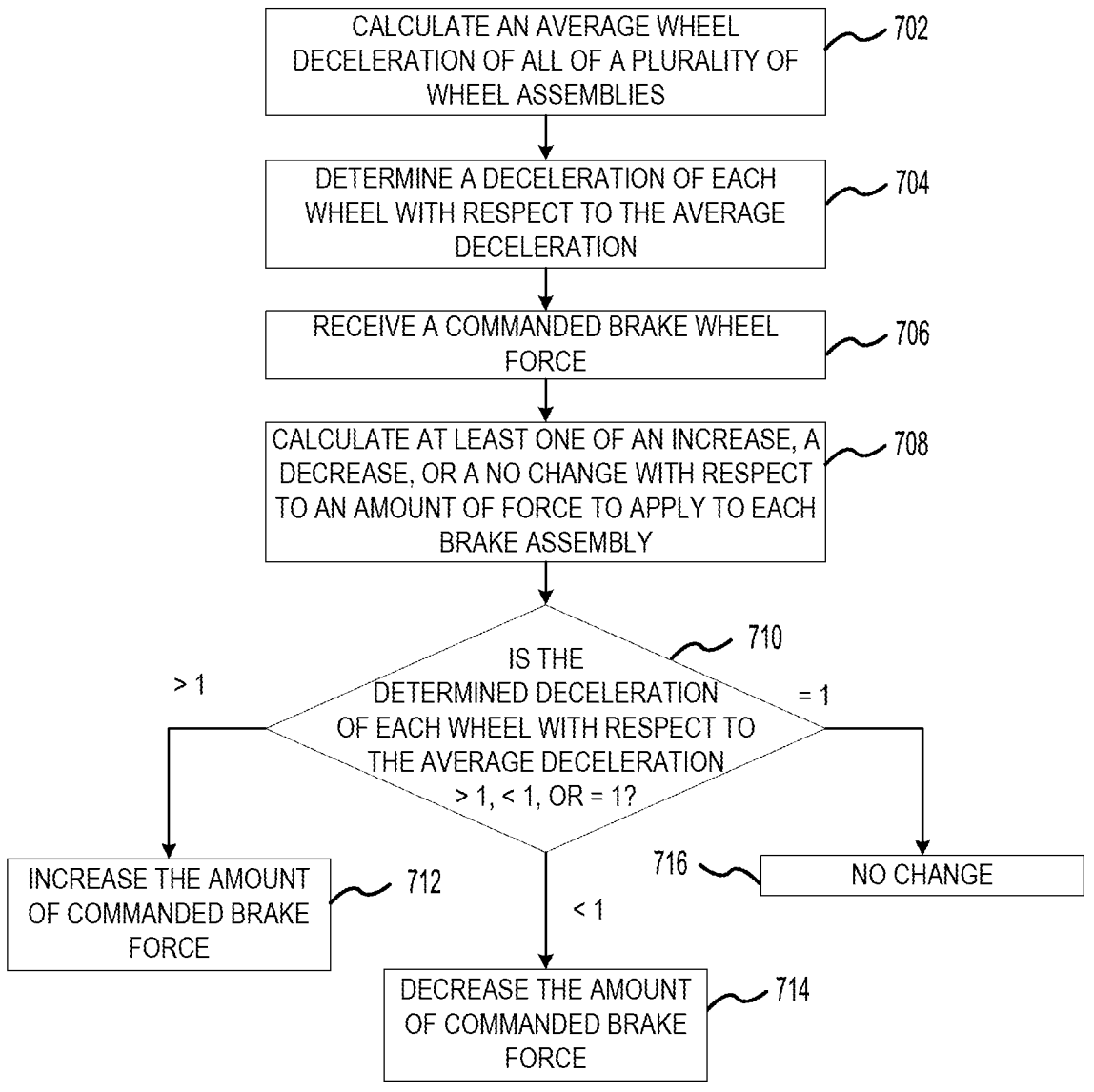
FIG. 7 illustrates a third method for aircraft brake control, in accordance with various embodiments.

Referring now to FIG. 7, in accordance with various embodiments, a method 700 for aircraft brake control is illustrated. Method 700 may be performed by processor within a brake control unit (BCU), such as BCU 150 of FIG. 2. At block 702, the BCU calculates the average wheel deceleration of all of a plurality of wheel assemblies. At block 704, utilizing an angular deceleration for each of the plurality of wheel assemblies that is accurately measured by a wheel speed transducer associated with each of the plurality of wheel speed transducers, the BCU determines a deceleration of each wheel with respect to the average deceleration using the following equation:

$$N(wheel\_k) = \frac{deceleration(wheel\_k)}{0.25 * \sum_{i=1}^{i=4} deceleration(i)}$$

where k varies from 1 to 4 in a 4-wheel aircraft. At block 706, the BCU receives a commanded brake wheel force. At block 708, the BCU utilizes the determined deceleration of each wheel with respect to the average deceleration, from block 704, and the received commanded brake wheel force, from block 706, to calculate at least one of an increase, a decrease, or a no change with respect to an amount of force to apply to a respective brake assembly associated with a respective one of the wheel assemblies in order to either increase an amount of commanded brake force, decrease an amount of commanded brake force, or command the requested amount of commanded brake force. Accordingly, if at block 710 the BCU determines a deceleration of each wheel with respect to the average deceleration is greater than 1, at block 712, the BCU increases the amount of commanded brake force. If at block 710 the BCU determines a deceleration of each wheel with respect to the average deceleration is less than 1, at block 714, the BCU decreases the amount of commanded brake force. If at block 710 the BCU determines a deceleration of each wheel with respect to the average deceleration is equal to 1, at block 716, the BCU makes not change to the amount of commanded brake force.

Accordingly, the various embodiments, utilize an estimated coefficient of friction (μ) for prognostics and health management (PHM) and improved load balance (LB). By comparing each of these decelerations against an average, the various embodiments identify brake performance starting to deteriorate. The various embodiments also provide improved load balance characteristics during braking to help even out the brake wear over autobrake landing stops. This tends to reduce the pilot effort to maintain the aircraft in a straight line during landing and evens the brake temperatures to help reduce potential early oxidation issues.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about," or "approximately" as used herein represent an amount close to the stated amount that still performs a desired function or achieves a desired result. For example, the term "substantially," "about," or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A method for controlling brake assemblies of a vehicle, the method comprising:
   receiving a deceleration of each wheel assembly of a plurality of wheel assemblies of the vehicle;
   comparing the deceleration of each wheel assembly to an average deceleration of the plurality of wheel assemblies;
   responsive to one or more of the deceleration of each wheel assembly of one or more wheel assemblies being outside a predetermined range of the average deceleration of the plurality of wheel assemblies, reporting a warning message to a maintenance crew to inspect one or more brake assemblies associated with the one or more wheel assemblies;
   responsive to one or more of the deceleration of each wheel assembly of the one or more wheel assemblies being outside the predetermined range of the average deceleration of the plurality of wheel assemblies, comparing the deceleration of the one or more wheel assemblies with respect to the average deceleration of the plurality of wheel assemblies over a predetermined number of taxi events;
   calculating a trend of out of tolerance differences after the predetermined number of taxi events; and
   responsive to the trend being confirmed after the predetermined number of taxi events, reporting the warning message to the maintenance crew to inspect the one or more brake assemblies associated with the one or more wheel assemblies.

2. The method of claim 1, wherein the deceleration of each wheel assembly of the plurality of wheel assemblies is determined by an associated wheel speed transducer as brakes are being applied to the respective wheel assembly.

3. The method of claim 1, wherein the predetermined range is ±20% of the average deceleration of the plurality of wheel assemblies.

4. The method of claim 1, further comprising:
   responsive to one or more of the deceleration of each wheel assembly of the one or more wheel assemblies being within the predetermined range of the average deceleration of the plurality of wheel assemblies, identifying that all brakes are functioning in a similar manner and reporting no issues.

5. The method of claim 1, further comprising:
   defining a wheel deceleration to brake force ratio based on brake information obtained from development and qualification of a plurality of brake assemblies of the plurality of wheel assemblies of the vehicle;
   during taxi when a force is applied to brake pedals, calculating a ratio of deceleration to brake force for each wheel assembly of the plurality of wheel assemblies;
   determining whether the ratio of deceleration to brake force for each wheel assembly of the plurality of wheel assemblies as compared to the defined wheel deceleration to brake force ratio within a predetermined range; and responsive to one or more ratios of deceleration to brake force for one or more wheel assembly of the plurality of wheel assemblies as compared to the defined wheel deceleration to brake force ratio being outside the predetermined range, reporting the warning message to the maintenance crew to inspect the one or more brake assemblies associated with the one or more wheel assemblies.

6. The method of claim 5, wherein the predetermined range is ±25%.

7. The method of claim 5, further comprising:

comparing the deceleration to brake force for each of the plurality of wheel assemblies to pre-stored values of deceleration to brake force for each of the plurality of wheel assemblies over a predetermined number of taxi events;

calculating a trend of out of tolerance differences after the predetermined number of taxi events; and responsive to the trend being confirmed after the predetermined number of taxi events, reporting the warning message to the maintenance crew to inspect the one or more brake assemblies associated with the one or more wheel assemblies.

8. A braking system for controlling brake assemblies of a vehicle, the braking system comprising:

a brake control unit, wherein the brake control unit is configured to:

receive a deceleration of each wheel assembly of a plurality of wheel assemblies of the vehicle;

compare the deceleration of each wheel assembly to an average deceleration of the plurality of wheel assemblies;

responsive to one or more of the deceleration of each wheel assembly of one or more wheel assemblies being outside a predetermined range of the average deceleration of the plurality of wheel assemblies, report a warning message to a maintenance crew to inspect one or more brake assemblies associated with the one or more wheel assemblies;

responsive to one or more of the deceleration of each wheel assembly of the one or more wheel assemblies being outside the predetermined range of the average deceleration of the plurality of wheel assemblies, compare the deceleration of each wheel assembly of the one or more wheel assemblies with respect to the average deceleration of the plurality of wheel assemblies over a predetermined number of taxi events;

calculate a trend of out of tolerance differences after the predetermined number of taxi events; and responsive to the trend being confirmed after the predetermined number of taxi events, report the warning message to the maintenance crew to inspect the one or more brake assemblies associated with the one or more wheel assemblies.

9. The braking system of claim 8, wherein the deceleration of each wheel assembly of the plurality of wheel assemblies is determined by an associated wheel speed transducer as brakes are being applied to the respective wheel assembly.

10. The braking system of claim 8, wherein the predetermined range is ±20% of the average deceleration of the plurality of wheel assemblies.

11. The braking system of claim 8, wherein the brake control unit is further configured to:

18 responsive to one or more of the deceleration of each wheel assembly of the one or more wheel assemblies being within the predetermined range of the average deceleration of the plurality of wheel assemblies, identify that all brakes are functioning in a similar manner and reporting no issues.

12. The braking system of claim 8, wherein the brake control unit is further configured to:

define a wheel deceleration to brake force ratio based on brake information obtained from development and qualification of a plurality of brake assemblies of the plurality of wheel assemblies of the vehicle;

during taxi when a force is applied to brake pedals, calculate a ratio of deceleration to brake force for each wheel assembly of the plurality of wheel assemblies;

determine whether the ratio of deceleration to brake force for each wheel assembly of the plurality of wheel assemblies as compared to the defined wheel deceleration to brake force ratio within a predetermined range; and responsive to one or more ratios of deceleration to brake force for one or more wheel assembly of the plurality of wheel assemblies as compared to the defined wheel deceleration to brake force ratio being outside the predetermined range, report the warning message to the maintenance crew to inspect the one or more brake assemblies associated with the one or more wheel assemblies.

13. The braking system of claim 12, wherein the predetermined range is ±25%.

14. The braking system of claim 12, wherein the brake control unit is further configured to:

compare the deceleration to brake force for each of the plurality of wheel assemblies to pre-stored values of deceleration to brake force for each of the plurality of wheel assemblies over a predetermined number of taxi events;

calculate a trend of out of tolerance differences after the predetermined number of taxi events; and responsive to the trend being confirmed after the predetermined number of taxi events, report the warning message to the maintenance crew to inspect the one or more brake assemblies associated with the one or more wheel assemblies.

15. A method for controlling brake assemblies of a vehicle, the method comprising:

calculating an average wheel deceleration for a plurality of wheel assemblies;

determining a deceleration of each wheel with respect to an average deceleration; and responsive to receiving a commanded brake wheel force, utilizing the deceleration of each wheel with respect to the average deceleration and the commanded brake wheel force to calculate at least one of an increase, a decrease, or a no change with respect to an amount of force to apply to a respective brake assembly associated with a respective wheel assembly of the plurality of wheel assemblies, wherein, responsive to calculating the increase in the amount of force to apply to the respective brake assembly, applying the commanded brake wheel force increased by the amount of force to the respective brake assembly.

16. The method of claim 15, wherein responsive to calculating the decrease in the amount of force to apply to the respective brake assembly, applying the commanded brake wheel force decreased by the amount of force to the respective brake assembly.

17. The method of claim 15, wherein responsive to calculating no change in the amount of force to apply to the respective brake assembly, applying the commanded brake wheel force to the respective brake assembly.

* * * * *